United States Patent
Zhang et al.

(10) Patent No.: US 11,407,111 B2
(45) Date of Patent: Aug. 9, 2022

(54) METHOD AND SYSTEM TO GENERATE A 3D MODEL FOR A ROBOT SCENE

(71) Applicant: ABB Schweiz AG, Baden (CH)

(72) Inventors: Biao Zhang, West Hartford, CT (US); Remus Boca, Simsbury, CT (US); Carlos W. Morato, Avon, CT (US); Carlos Martinez, South Windsor, CT (US); Jianjun Wang, West Hartford, CT (US); Zhou Teng, Hartford, CT (US); Jinmiao Huang, Vernon, CT (US); Magnus Wahlstrom, Västerås (SE); Johnny Holmberg, Hallstahammar (SE)

(73) Assignee: ABB Schweiz AG, Baden (CH)

( * ) Notice: Subject to any disclaimer, the term of this patent is extended or adjusted under 35 U.S.C. 154(b) by 199 days.

(21) Appl. No.: 16/019,768

(22) Filed: Jun. 27, 2018

(65) Prior Publication Data
US 2020/0001458 A1   Jan. 2, 2020

(51) Int. Cl.
*B25J 9/16* (2006.01)
*B25J 19/02* (2006.01)
*G06V 20/10* (2022.01)

(52) U.S. Cl.
CPC .......... *B25J 9/1666* (2013.01); *B25J 9/1612* (2013.01); *B25J 9/1671* (2013.01); *B25J 9/1697* (2013.01); *B25J 19/023* (2013.01); *G06V 20/10* (2022.01)

(58) Field of Classification Search
CPC ...... B25J 9/1666; B25J 9/1612; B25J 9/1671; B25J 9/1697; B25J 19/023; B25J 9/16;
(Continued)

(56) References Cited

U.S. PATENT DOCUMENTS 6,526,373 B1  2/2003  Barral
6,721,444 B1  4/2004  Gu et al.
(Continued)

FOREIGN PATENT DOCUMENTS

CN    102323822 A    1/2012
CN    104484522 B    10/2017
(Continued)

OTHER PUBLICATIONS

"A system for semi-automatic modeling of complex environments;" Johnson, A.E. , Hoffman, R. , Osborn, J. • Hebert, M.; Proceedings. International Conference on Recent Advances in 3-D Digital Imaging and Modeling (Cat. No.97TB100134) (pp. 213-220); Jan. 1, 1997.*

(Continued)

*Primary Examiner* — Khoi H Tran
*Assistant Examiner* — Jorge O Peche
(74) *Attorney, Agent, or Firm* — Leydig, Voit & Mayer, Ltd.

(57) ABSTRACT

A robot is configured to perform a task on an object using a method for generating a 3D model sufficient to determine a collision free path and identify the object in an industrial scene. The method includes determining a predefined collision free path and scanning an industrial scene around the robot. Stored images of the industrial scene are retrieved from a memory and analyzed to construct a new 3D model. After an object is detected in the new 3D model, the robot can further scan the image in the industrial scene while moving along a collision free path until the object is identified at a predefined certainty level. The robot can then perform a robot task on the object.

8 Claims, 8 Drawing Sheets

(58) Field of Classification Search
CPC .............. B25J 9/1676; G06K 9/00664; G05B 2219/40424; G05B 2219/40323; G05B 2219/40476
See application file for complete search history.

(56) References Cited

U.S. PATENT DOCUMENTS

| | | | |
|---|---|---|---|
| 7,236,854 B2 | 6/2007 | Pretlove et al. | |
| 7,865,267 B2 | 1/2011 | Sabe et al. | |
| 8,095,237 B2 | 1/2012 | Habibi et al. | |
| 8,538,685 B2* | 9/2013 | Johnson | H04L 67/18 701/425 |
| 8,688,275 B1* | 4/2014 | LaFary | G05D 1/0274 700/254 |
| 8,793,205 B1 | 7/2014 | Fisher et al. | |
| 8,942,468 B1 | 1/2015 | Toshev et al. | |
| 8,958,912 B2 | 2/2015 | Blumberg et al. | |
| 9,031,317 B2 | 5/2015 | Yakubovich et al. | |
| 9,050,719 B2 | 6/2015 | Valpola et al. | |
| 9,102,055 B1* | 8/2015 | Konolige | G06V 10/42 |
| 9,205,886 B1* | 12/2015 | Hickman | G06Q 10/087 |
| 9,227,323 B1* | 1/2016 | Konolige | B25J 9/1697 |
| 9,272,417 B2 | 3/2016 | Konolige et al. | |
| 9,333,649 B1* | 5/2016 | Bradski | G06V 10/60 |
| 9,424,470 B1* | 8/2016 | Hinterstoisser | G06V 10/462 |
| 9,434,072 B2 | 9/2016 | Buehler et al. | |
| 9,457,477 B1* | 10/2016 | Rublee | B25J 15/0023 |
| 9,471,206 B2 | 10/2016 | Girardeau | |
| 9,592,609 B2* | 3/2017 | LaFary | G05D 1/024 |
| 9,630,320 B1 | 4/2017 | Konolige et al. | |
| 9,630,321 B2 | 4/2017 | Bradski et al. | |
| 9,643,316 B2 | 5/2017 | Krasny et al. | |
| 9,669,544 B2 | 6/2017 | Buehler et al. | |
| 9,694,499 B2* | 7/2017 | Gotou | B25J 9/1697 |
| 9,746,852 B1 | 8/2017 | Watts et al. | |
| 9,919,421 B2 | 3/2018 | Rossano et al. | |
| 10,060,857 B1* | 8/2018 | Bouchard | G01N 21/8851 |
| 10,341,639 B2* | 7/2019 | Wang | E21D 9/003 |
| 10,705,528 B2* | 7/2020 | Wierzynski | G06T 17/05 |
| 11,006,039 B1* | 5/2021 | Yu | H04N 5/23218 |
| 2004/0093122 A1 | 5/2004 | Galibraith | |
| 2006/0016066 A1* | 1/2006 | Gaida | H05K 13/0815 29/407.04 |
| 2010/0179689 A1 | 7/2010 | Lin | |
| 2011/0196533 A1 | 8/2011 | Scheurer et al. | |
| 2012/0120264 A1* | 5/2012 | Lee | H04N 5/23254 348/208.4 |
| 2012/0121132 A1 | 5/2012 | Asahara et al. | |
| 2012/0182392 A1* | 7/2012 | Kearns | B25J 19/023 348/46 |
| 2012/0215354 A1* | 8/2012 | Krasny | B25J 9/1666 901/1 |
| 2012/0290130 A1 | 11/2012 | Kapoor | |
| 2013/0178980 A1 | 7/2013 | Chemouny et al. | |
| 2013/0343640 A1 | 12/2013 | Buehler et al. | |
| 2014/0022353 A1* | 1/2014 | Hamersma | G05B 19/4061 348/46 |
| 2015/0012209 A1 | 1/2015 | Park et al. | |
| 2015/0071488 A1* | 3/2015 | Wei | G06T 7/536 382/103 |
| 2015/0328773 A1 | 11/2015 | Boca et al. | |
| 2016/0016311 A1* | 1/2016 | Konolige | B25J 9/1633 901/30 |
| 2016/0089791 A1 | 3/2016 | Bradski et al. | |
| 2016/0129592 A1* | 5/2016 | Saboo | B25J 9/1661 700/248 |
| 2016/0288330 A1* | 10/2016 | Konolige | H04N 13/239 |
| 2017/0091999 A1 | 3/2017 | Blumenfeld et al. | |
| 2017/0092000 A1 | 3/2017 | Schwimmer | |
| 2017/0138192 A1 | 5/2017 | Wang et al. | |
| 2017/0330415 A1* | 11/2017 | Sato | G07F 17/3211 |
| 2017/0355078 A1* | 12/2017 | Ur | G06V 20/10 |
| 2018/0222050 A1* | 8/2018 | Vu | G01S 7/4808 |
| 2018/0232906 A1* | 8/2018 | Kim | G06T 7/246 |
| 2018/0250820 A1* | 9/2018 | Shimodaira | B25J 9/1669 |
| 2018/0250821 A1* | 9/2018 | Shimodaira | B25J 9/1697 |
| 2018/0253516 A1* | 9/2018 | Shimano | B25J 9/1697 |
| 2018/0283017 A1* | 10/2018 | Telleria | B24B 55/06 |
| 2018/0297204 A1* | 10/2018 | Krasny | B25J 9/163 |
| 2018/0361586 A1* | 12/2018 | Tan | B61J 99/00 |
| 2018/0364870 A1* | 12/2018 | Mei | B25J 11/0005 |
| 2019/0146515 A1* | 5/2019 | De Salvo | B60W 30/09 701/23 |
| 2019/0176341 A1* | 6/2019 | Mei | B25J 11/0005 |
| 2019/0188477 A1* | 6/2019 | Mair | G01C 21/206 |
| 2019/0206400 A1* | 7/2019 | Cui | G05D 1/0016 |
| 2019/0261566 A1* | 8/2019 | Robertson | A01G 9/143 |
| 2019/0291277 A1* | 9/2019 | Oleynik | B25J 9/162 |
| 2019/0351557 A1* | 11/2019 | Suzuki | B25J 19/023 |
| 2019/0389062 A1* | 12/2019 | Truebenbach | B25J 9/1612 |
| 2020/0001458 A1* | 1/2020 | Zhang | B25J 19/023 |
| 2020/0055195 A1* | 2/2020 | Ignakov | B25J 13/06 |
| 2020/0061839 A1* | 2/2020 | Deyle | G06Q 10/087 |
| 2020/0094411 A1* | 3/2020 | Tan | B61G 7/04 |
| 2020/0117212 A1* | 4/2020 | Tian | B25J 9/1689 |
| 2020/0117213 A1* | 4/2020 | Tian | B25J 19/023 |
| 2020/0117898 A1* | 4/2020 | Tian | G06F 3/04815 |
| 2020/0147804 A1* | 5/2020 | Sugiyama | G06T 7/73 |
| 2020/0184196 A1* | 6/2020 | Foster | G06V 20/653 |
| 2020/0206928 A1* | 7/2020 | Denenberg | G01S 7/4808 |
| 2020/0250879 A1* | 8/2020 | Foster | G05D 1/0276 |
| 2020/0254611 A1* | 8/2020 | Sakui | B25J 9/02 |
| 2020/0269429 A1* | 8/2020 | Chavez | B25J 11/0045 |
| 2020/0306980 A1* | 10/2020 | Choi | B25J 9/1697 |
| 2020/0311956 A1* | 10/2020 | Choi | G06V 10/82 |
| 2020/0316782 A1* | 10/2020 | Chavez | G06T 7/12 |
| 2020/0331146 A1* | 10/2020 | Vu | B25J 19/06 |
| 2020/0331155 A1* | 10/2020 | Vu | G08B 3/00 |
| 2020/0361093 A1* | 11/2020 | Furukawa | B25J 15/0052 |
| 2021/0039257 A1* | 2/2021 | Tonogai | B25J 9/1669 |
| 2021/0092464 A1* | 3/2021 | Gupta | H04N 21/816 |
| 2021/0402595 A1* | 12/2021 | Beinhofer | G05B 19/4183 |

FOREIGN PATENT DOCUMENTS

| | | | | |
|---|---|---|---|---|
| CN | 206775653 U | * | 12/2017 | |
| CN | 108537875 A | * | 9/2018 | ............ B25J 9/1669 |
| CN | 110640730 | * | 1/2020 | |
| CN | 110660101 A | * | 1/2020 | |
| CN | 111090688 A | * | 5/2020 | ......... G06F 16/2474 |
| DE | 102010007458 A1 | | 8/2011 | |
| EP | 0380513 | * | 6/1997 | |
| EP | 2512756 A1 | | 10/2012 | |
| EP | 1854037 B1 | | 12/2014 | |
| EP | 2931485 A1 | | 10/2015 | |
| KR | 102178239 B1 | * | 11/2020 | ............ G06T 15/20 |
| WO | WO 1989/001850 | * | 3/1989 | |
| WO | WO-2011031523 A2 | * | 3/2011 | ............ B25J 9/1687 |
| WO | 2016172718 A1 | | 10/2016 | |
| WO | 2017220128 A1 | | 12/2017 | |
| WO | WO 2019/028075 | * | 2/2019 | |
| WO | WO 2021/101561 | * | 5/2021 | |

OTHER PUBLICATIONS

"Collision free motion planning for robots by capturing the environment;" Philipp Blanke • Marvin Boltes, Simon Storms, Lars Lienenluke, Christian Brecher; 2020 25th IEEE International Conference on Emerging Technologies and Factory Automation (ETFA) (vol. 1, pp. 636-642); Sep. 1, 2020.*

"'Bring it to me'—generation of behavior-relevant scene elements for interactive robot scenarios;" Nils Einecke, Manuel Muhlig, Jens Schmudderich, Michael Gienger; 2011 IEEE International Conference on Robotics and Automation (pp. 3415-3422); Nov. 18, 2011.*

European Patent Office, Extended European Search Report in corresponding application No. 19182955.5, dated Nov. 25, 2019, 8 pp.

* cited by examiner

METHOD AND SYSTEM TO GENERATE A 3D MODEL FOR A ROBOT SCENE

TECHNICAL FIELD

The present application generally relates to modeling of an industrial scene by a robot, and more particularly, but not exclusively, to constructing a 3D model of an industrial scene with scans taken with a vision sensor associated with a robot.

BACKGROUND

As the field of robotics continues to advance, an increasing amount of focus is placed on the development of technologies that permit a robot to determine collision free pathways and the location of a work piece or other objects in real time. Randomly placed objects within a robot work area or industrial scene can cause interference with certain movements of the robot and prevent work tasks from being completed. Some existing systems have various shortcomings relative to certain applications. Accordingly, there remains a need for further contributions in this area of technology.

SUMMARY

One embodiment of the present application is a unique system and method for generating a real time 3D model of a robot work area or industrial scene. Other embodiments include apparatuses, systems, devices, hardware, methods, and combinations for generating a collision free path for robot operation in an industrial scene. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the application, reference will now be made to the embodiments illustrated in the drawings and specific language will be used to describe the same. It will nevertheless be understood that no limitation of the scope of the application is thereby intended. Any alterations and further modifications in the described embodiments, and any further applications of the principles of the application as described herein are contemplated as would normally occur to one skilled in the art to which the application relates.

As the field of robotics continues to advance, an increasing amount of focus is placed on the development of technologies that permit more tightly coupled human-robot interaction (HRI). Application of HRI technologies facilitates robot understanding of information about its surrounding environment and permits an operator to understand or receive feedback about the level of understanding that the robot has attained. Before interaction occurs between an operator and a robot, an initial understanding of the working environment or industrial scene can be obtained. As the robot's understanding of the scene increases, the level of human interaction can decrease (i.e. an operator does not have to program all information into the robot prior to operation which minimizes setup time).

The robot system disclosed herein provides for control methods to retrieve valid information from an industrial scene that can be recognizable by the robot's memory. The control methods enable the robot to obtain information and understanding of elements or objects in the scene while simultaneously optimizing robot motion to perform a task within the industrial scene. This robot path is reactive to variation of the scene and helps the robot to understand the boundaries of the surroundings. The ability for the robot to autonomously retrieve information from the scene facilitates detection of objects, constructive robot motion generation, reduction of time required for overall discovery process and minimizes human involvement in setup and robot programming. Industrial robots can use teach pendants and joy sticks for "jogging a robot" and teaching robot points, however this can be cumbersome, time consuming and dangerous if the operator is in close proximity to the robot while the robot moves through the industrial scene. 3D vision and implicit programming can be used to improve robot path programming by generating a 3D model of an unknown scene around a robot, it takes time to teach the robot to hold a 3D sensor to scan the industrial scene. It can be difficult to manually generate the scanning path to collect sufficient data from the scene and the object without a robot collision and/or incurring reachability problems.

The present disclosure includes methods and systems for automatically generating a complete 3D model of an industrial scene for robotic application that reduces engineering time and cost over manually programming the robot. The methods and systems automatically generate a scanning path to collect sufficient data about the scene and the object location without causing a collision or a reachability problem. The robot scanning system is operably connected to the robot path planning algorithm to the 3D object recognition algorithm so as to provide control input to the robot to perform a task on an object within the industrial scene.

Figure 1:
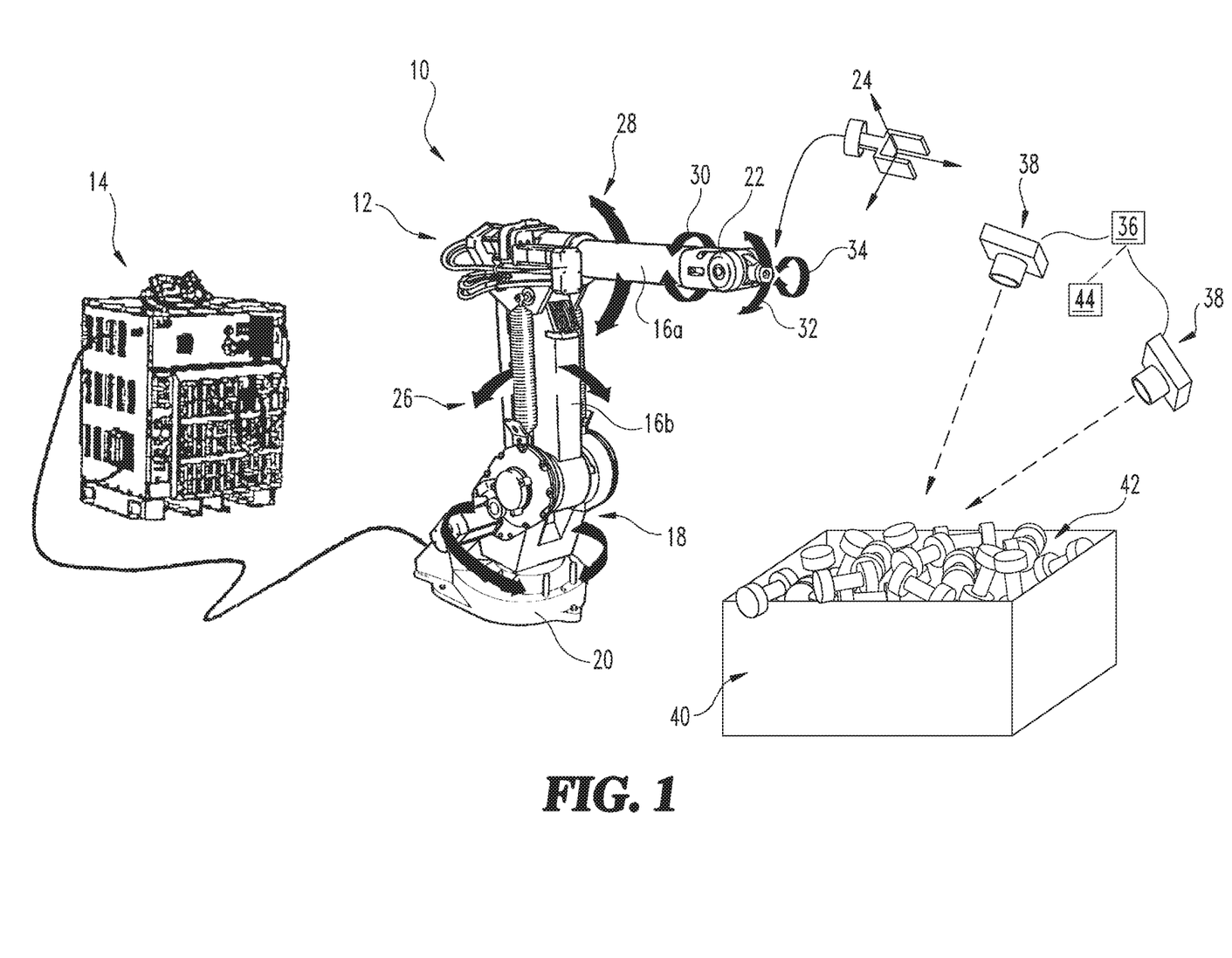
FIG. 1 is a schematic illustration of a robot system according to one exemplary embodiment of the present disclosure.

Referring now to FIG. 1, an illustrative robot system 10 is shown in an exemplary working environment or industrial scene. It should be understood that the robot system shown herein is exemplary in nature and that variations in the robot and/or industrial scene is contemplated herein. The robot system 10 can include a robot 12 with a vision system 36 having one or more cameras 38. In one form, one or more of the cameras 38 can be mounted on one of the moveable arms 16a, 16b of the robot 12. In other forms, one or more cameras 38 may be positioned apart from the robot 12. A control system 14 including an electronic controller with a CPU, a memory, and input/output systems are operably coupled to the robot 12 and to the vision system 36. The control system 14 is operable for receiving and analyzing images captured by the vision system 36 and other sensor data used for operation of the robot 12. In some forms, the control system 14 is defined within a portion of the robot 12.

The robot 12 may include a movable base 20 and a plurality of movable portions connected thereto. The movable portions may translate or rotate in any desired direction. By way of example and not limitation, movable portions illustrated by arrows 18, 26, 28, 30, 32 and 34 may be employed by the exemplary robot 12. A bin 40 for holding workpieces or other objects 42 to be retrieved and/or worked on by the robot 12 may constitute at least a part of the exemplary industrial scene. An end effector 24 such as a gripping or grasping mechanism or other working tools can be attached to the moveable arm 16a and used to grasp an object 42 and/or perform other work tasks on the object 42 as desired. It should be understood that the term "bin" is exemplary in nature and as used herein means, without limitation, any container, carton, box, tray or other structure that can receive and/or hold workpieces, parts or other objects. Additional components 44 can be associated with the vision system 36. These components 44 can include lighting systems, reflector(s), refractor(s) and beam expander(s) or the like.

Figure 2:
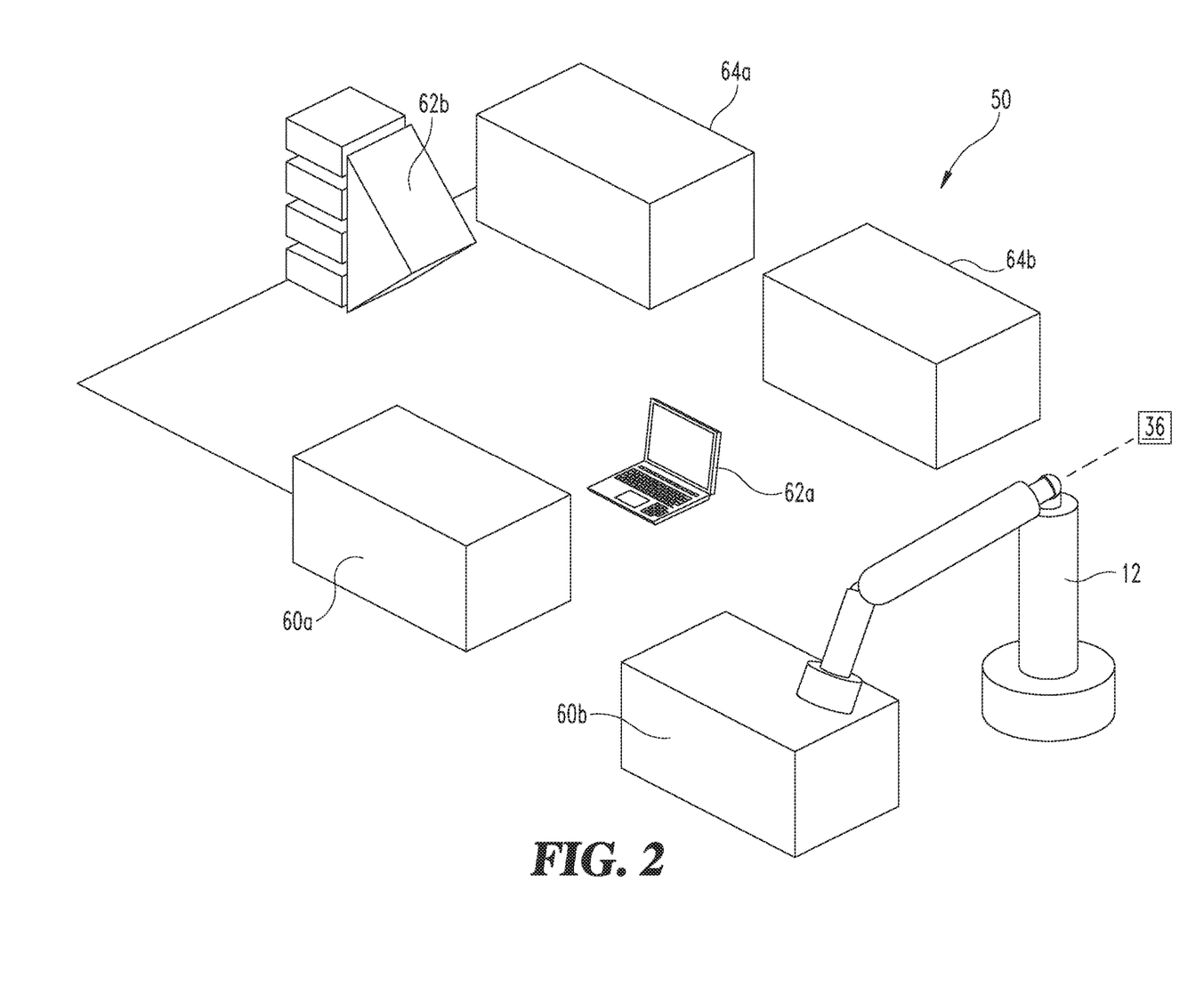
FIG. 2 is a schematic illustration of an industrial robot scene according to one exemplary embodiment of the present disclosure.

Referring now to FIG. 2, another exemplary industrial scene 50 is illustrated. The vision system 36 is operable with the robot 12 to determine locations of various items within the vicinity of the robot 12. By way of example and not limitation, the scene 50 includes picking bins 60a, 60b, potential obstacles 62a, 62b and dropping bins 64a, 64b. The vision system 36 can be used to determine object location and orientation in the picking bins 60a, 60b and/or the dropping bins 64a, 64b. The vision system 36 can identify an object inside a picking bin 60a and transmit a location and orientation of the object to the robot controller 14 (see FIG. 1). The robot controller (not shown) then provides commands to the robot 12 to control movement of portions of the robot 12 including the grasping mechanism (not shown) in order to grasp and move a selected object and avoid potential obstructions.

Teaching and training a robot to autonomously discover and understand an industrial scene and to perform robot work tasks such as extracting randomly arranged objects from a bin is a complex task. Given a 2D RGB (red, green blue) sensor image, the robot 12 can be trained to identify the picking and dropping bins 60a, 64a, and obstacles 62a, 62b within the scene 50. In addition, a 2D image can be combined with a calibrated 3D camera sensor to generate accurate spatial location of certain recognized objects. In some aspects, a 3D point cloud based scene reconstruction can be time consuming, however some portions of 3D point cloud data can be used reconstruct a scene for robot training in a virtual environment from the point cloud data to reconstruct a virtual 3D scene that can be used to train the robot in real time. The method for determining such robot commands in an autonomous fashion is described in more detail below.

The control method for defining an automated robot path starts from an initial viewpoint of the robot 12. The control method directs the robot 12 to pan the 3D sensor which can be mounted on the tip of the robot gripper 24 in one exemplary form. Next, an initial 3D model of the scene around the robot 12 is reconstructed with 3D sensor data and robot 12 movement information (3D sensor pose, timestamp, etc.). The initial 3D model of the scene will be analyzed for parameters such as occupancy, missing information, occluded objects, unknown areas, etc. Scene reconstruction is continuously updated during robot 12 operation. Computer processing computation for the scene reconstruction can be done independently and in parallel to robot 12 work tasks such as picking or dropping work tasks. A new scan angle may only be generated if the system cannot recognize an object 42 based on the previously gathered information. New scans and robot 12 move path calculations may or may not be performed solely to complete the scene reconstruction process. The new scan angles are generated based the prior knowledge from the scene understanding. Based on the observed data, a posterior predictive distribution can be calculated and a maximum likelihood estimation of the probability can be used to determine a new view angle that would yield the most useful information to further the understanding of the robot 12.

Figure 3:
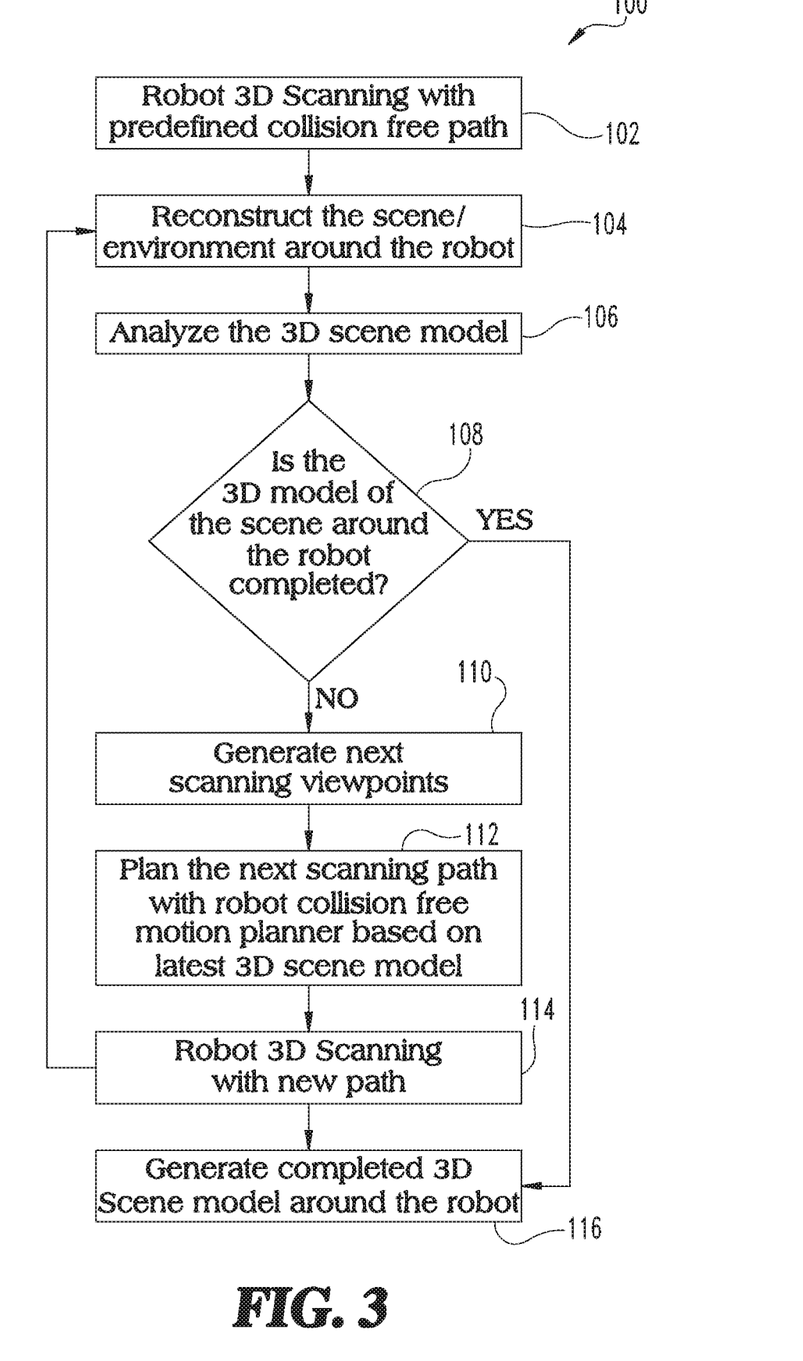
FIG. 3 is a flowchart directed to a method for generating a scanning path for collision free robot motion according to one embodiment of the present disclosure.

Referring now to FIG. 3 a flow chart illustrates a control method 100 for generating a scanning path for collision free robot motion according to one embodiment of the present disclosure. The control method 100 begins at step 102 where the robot starts with a predefined 3D scan of a collision free path. At step 104 the robot re-constructs the scene and the environment around the robot with a 3D scanning device. The scanning device will transmit scanned images to a memory such that the control system can then analyze the 3D scene model at step. The control method 100, at step 108 then determines whether the 3D model of the scene around the robot is completed sufficiently for the robot to perform a desired task. If the answer to the query at step 108 is "no," then the control method 100 will generate the next scanning viewpoint for the 3D scanner to obtain additional images. At step 112, the control method 100 plans the next scanning path with a robot collision free motion planner based on the latest 3D scene model. At step 114, the robot will scan the industrial scene along the next collision free path to obtain scanned images from a different viewpoint. At step 116, the control method 100 generates a complete 3D scene model around the robot. Referring back to step 108, if the answer to the query is "yes," then the control method 100 moves to step 116 and generates a complete 3D scene model around the robot without processing steps 110, 112 and 114.

Figure 4:
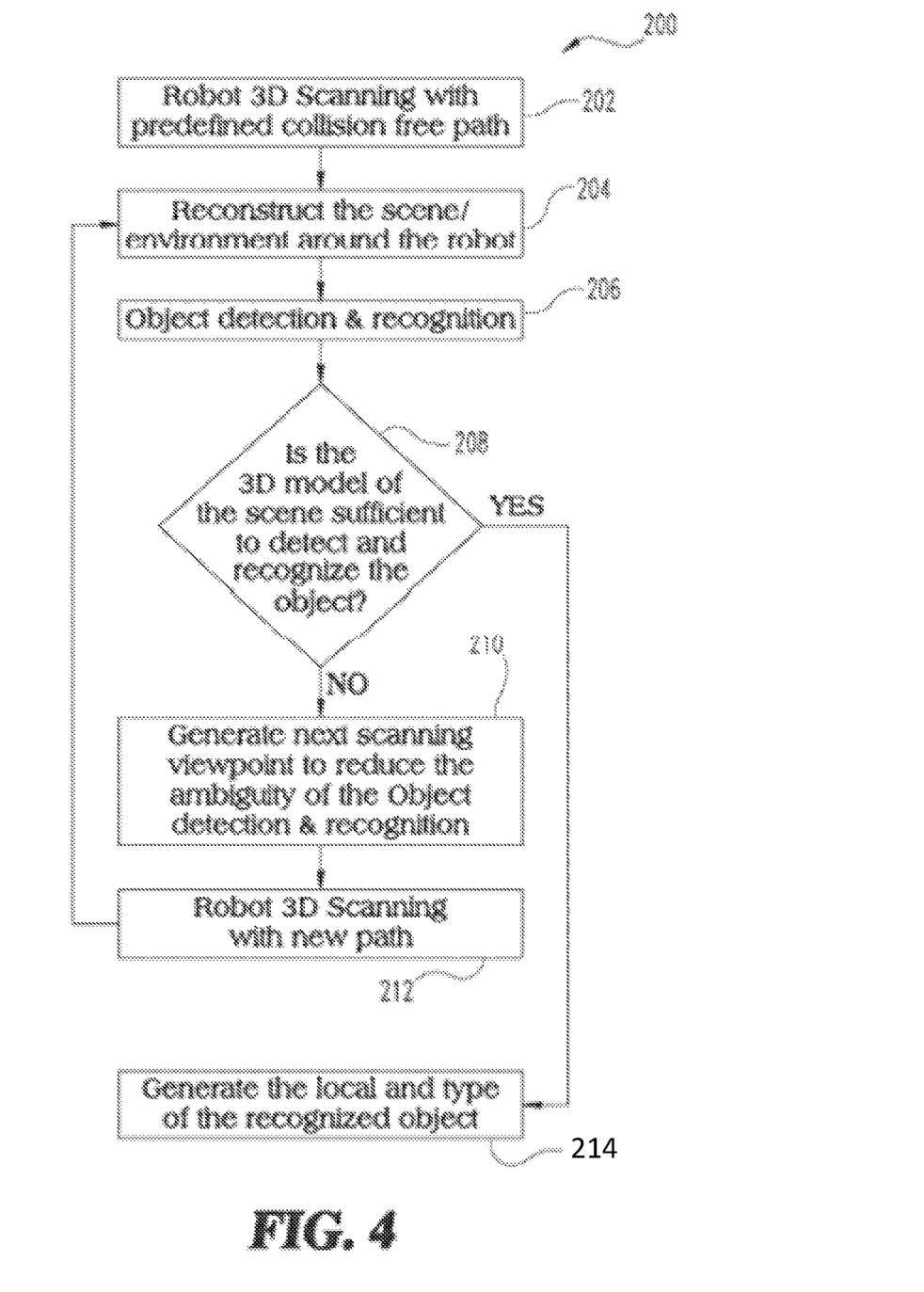
FIG. 4 is a flowchart directed to a method for recognition of an object in the industrial scene.

Referring now to FIG. 4, a control method 200 is illustrated whereby a robot learns to recognize an object within an industrial scene. The control method 200 starts at step 202 where the robot determines a predefined collision free path with a 3D scanning device. At step 204 the robot reconstructs the scene including the environment around the robot. At step 206 the control method 200 runs an object detection and recognition program. At step 208 a query by the control method 200 causes a determination to be made as to whether the 3D model of the scene is sufficient to detect and recognize the object to the extent required to perform a robot task thereon. If the answer to query 208 is "no," then the control method 200 at step 210 will generate a next scanning viewpoint to reduce the ambiguity of the object with the detection and recognition program. At step 212, the robot will perform a 3D scan along a new collision free path. Referring back to step 208, if the answer to the query is "yes," then the control method 200 moves to step 214 where the control method 200 generates the local scene model with the recognized object for the robot to perform a robot task thereon.

Figure 5:
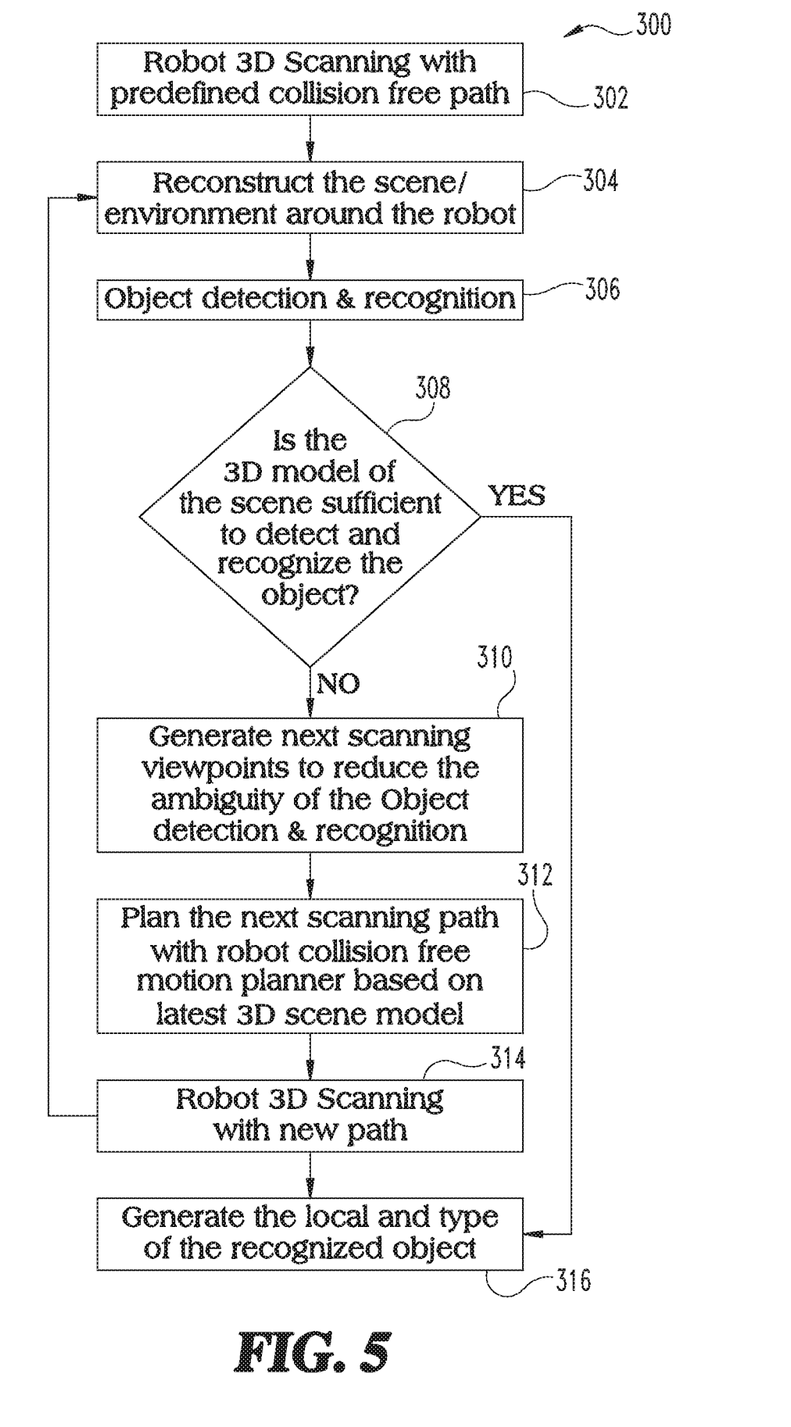
FIG. 5 is a flowchart directed to a method for generating a 3D model sufficient to reduce ambiguity of the object such that a work task may be performed on an object by the robot.

Referring now to FIG. 5, a control method 300 is illustrated beginning at step 302 where a robot uses 3D scanning to define a predefined collision free path. At step 304 the control method 300 directs the robot to reconstruct the industrial scene around the robot. The control method 300, at step 306 then uses the object detection and recognition program to analyze the scene construction obtained by the robot and at query 308 the system determines whether the scene is sufficient to affirmatively detect and recognize the object. If the answer to query 308 is "no," then at step 310 the control method 300 will direct the robot to generate additional scanning viewpoints in order to reduce the ambiguity of the object. A at step 312, the control method 300 plans the next scanning path with the robot collision free motion planner based on the latest 3D scene model. The robot then performs a new 3D scanning path at step 314. The latest 3D scanning on the new path is used to generate a new local scene model and determine the type of object at step 316. Referring back to query 308, if the answer is "yes," as to whether or not the 3D model was sufficient to detect and recognize the object, then the control method 300 moves down to step 316 so as to permit the robot to perform a robot work task on the recognized object.

Figure 6:
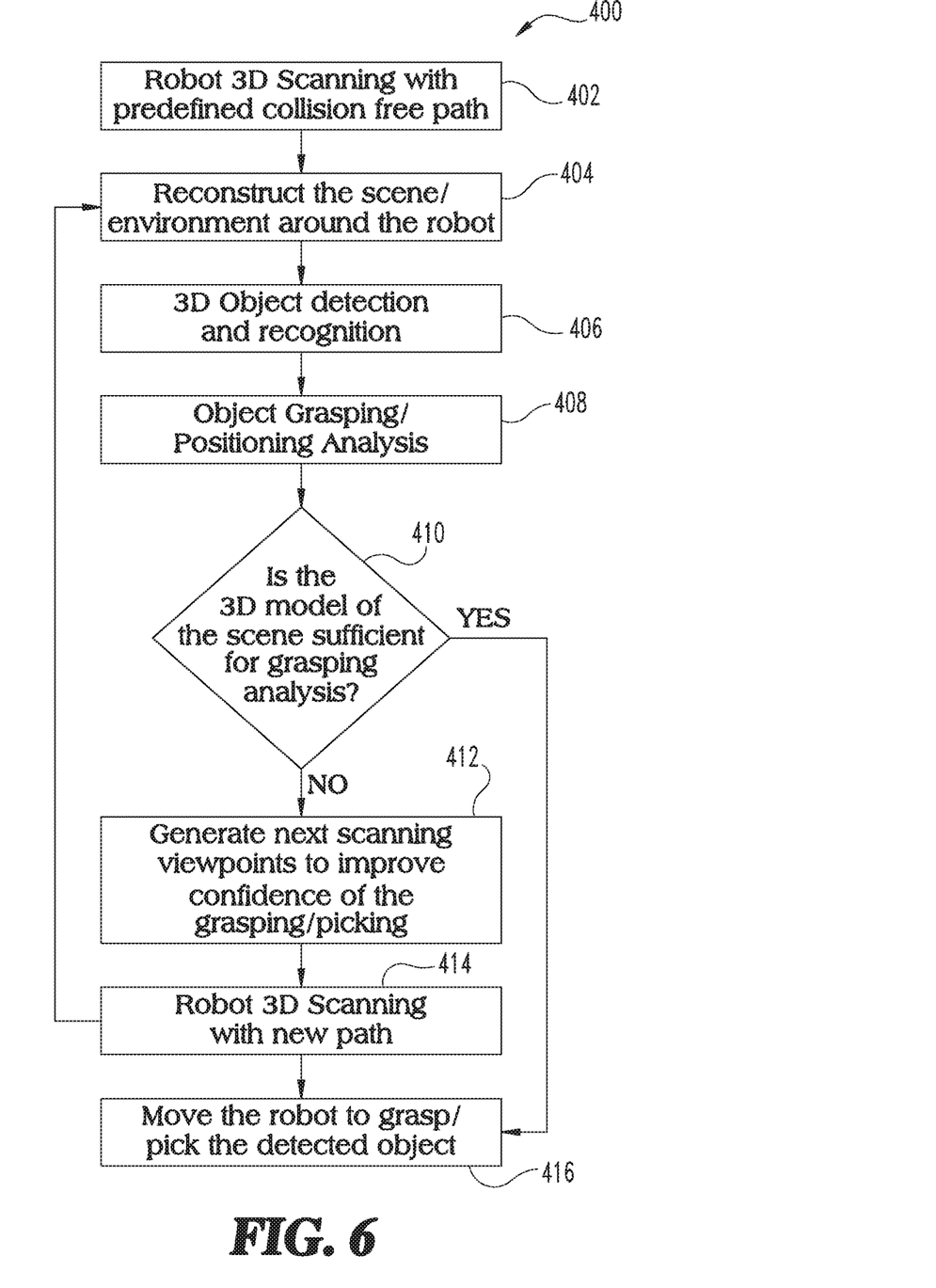
FIG. 6 is a flowchart directed to a method for improving object recognition and planning a next scanning path for collision free motion so that the robot may perform a task on a detected object.

Referring now to FIG. 6, a control method of operation 400 is provided for the robot to perform a work task on an object such as picking or grasping. At step 402, the robot obtains a predefined collision free path from a 3D scan. The robot at step 404 then reconstructs the industrial scene around the robot to determine whether an object is detected within the scene. The robot will use the 3D object detection and recognition program at step 406 to determine whether the 3D scene around the robot has a desired object located therein and if so, at step 408 the control method 400 runs an object grasping and positioning analysis to determine whether the 3D model of the scene is sufficient for grasping the object at query 410. If the answer to query 410 is "no," then at step 412, the control method 400 will generate a next scanning viewpoint to improve the confidence of the grasping analysis. The control method 400 at step 414 will determine a collision free path for the robot to move along so that the vision system can obtain a 3D scan of the environment. At step 416, the robot will perform a work task on the object such as grasping or picking the object after the 3D model is determined to be sufficient to perform such a task. If the 3D model of the scene is sufficient for the robot to perform a work task at 410 then the control method 400 moves to step 416 and the robot is then directed to perform the task on the detected object.

Figure 7A:
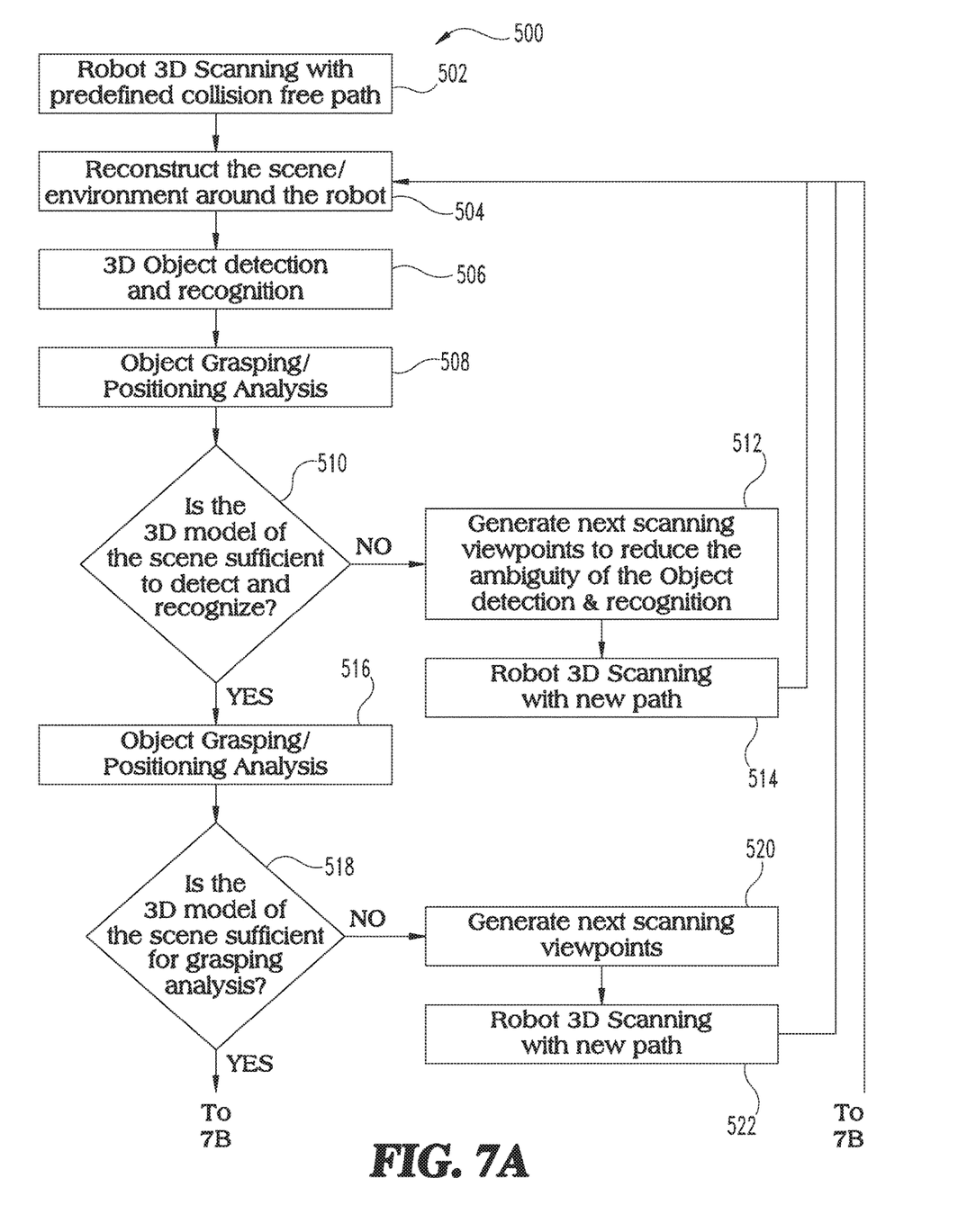
FIGS. 7A and 7B define a flowchart directed to a method for improving object recognition, improving grasping confidence and planning a next scanning path for collision free motion.
Figure 7B:
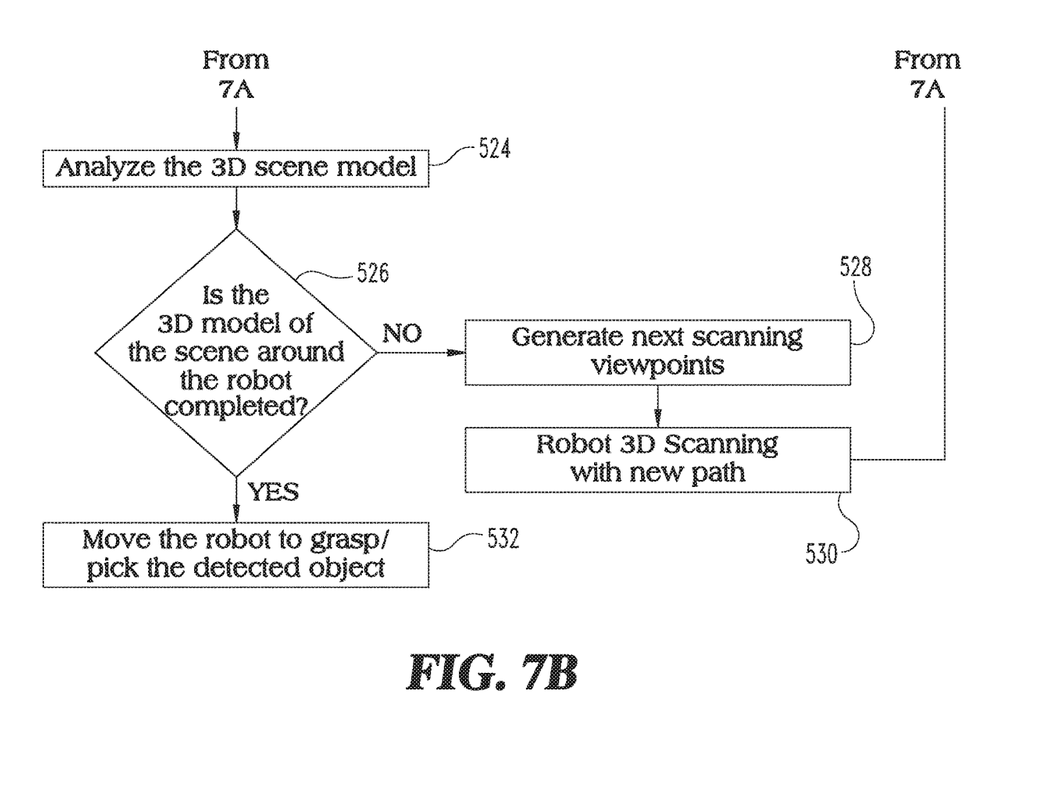

Referring now to FIGS. 7A and 7B, a control method 500 for improving object recognition, improving grasping confidence and planning scanning paths for collision free motion for a robot is illustrated. The control method 500 begins at step 502 where the robot obtains a predefined collision free path from a prior 3D scan of the work environment. At step 504, the robot then reconstructs the industrial scene around the robot and performs a 3D object detection and recognition analysis at step 506. After the object is recognized, the robot will perform an object grasping and positioning analysis at step 508. At query 510, the control method 500 will determine whether the 3D model of the industrial scene is sufficient to detect and recognize the object. If it is not, then at step 512, the control method 500 will generate a new scanning viewpoint to reduce the ambiguity of the object. At step 514, the robot will plan a new path and based on the scanning viewpoints at step 512, the robot will move along the path and produce additional 3D scanning images. The control method 500 then will move back to step 504 and repeat steps 504, 506 and 508 until the scene model is sufficiently complete at query 510. If the 3D model of the scene is sufficient to detect and recognize the object, then at step 516 the object grasping positioning analysis is run once again. A query is performed at step 518 to determine if a 3D model of the industrial scene is sufficient for the grasping analysis to direct the robot to grasp the object. If the answer is "no," to query 518 then at step 520, the control method 500 will generate new scanning viewpoints and cause the robot to move along a new path at step 522 to provide a new 3D scan at different viewpoints. The control method 500 then loops back to step 504 and repeats steps 504, 506, 508, 510, 516 and 518 until the answer to each of the queries at step 510 and 518 is "yes." The control method 500 analyzes the 3D scene model at step 524 and determine whether the 3D model of the scene around the robot is complete at query 526. If not, then the control method 500 generates the next scanning viewpoints at step 528, directs the robot to scan a new collision free path at step 530 and then moves back to step 504 to repeat the answer to query 526 is "yes." At that point the robot is directed to grasp and pick up a detected object or perform other work tasks on the object at step 532.

In one aspect the present disclosure includes a method comprising: determining a predefined collision free robot path; moving a robot along the predefined robot path; scanning an industrial scene with a scanning sensor positioned on a robot while moving along the predefined robot path; storing scanned images of the industrial scene in a memory; constructing a 3D model of the industrial scene based on the images stored in the memory; planning a next collision free robot path based on the 3D model; moving the robot along the next collision free robot path; scanning an industrial scene with the scanning sensor positioned on the robot while moving along the next robot path; and storing new scanned images in the memory; and reconstructing the 3D model of the industrial scene based on the new scanned images.

In refining aspects, the method further comprising repeating the planning, scanning, storing and reconstructing steps until a completed 3D industrial scene is constructed; further comprising performing a work task with the robot after completing the 3D industrial scene model; wherein the scanning sensor is a 3D camera; further comprising moving the scanning sensor relative to the robot when determining the predefined collision free path; wherein the moving of the scanning sensor includes panning, tilting, rotating and translating movement relative to the robot; wherein the moving of the scanning sensor includes moving an arm of the robot while a base of the robot remains stationary; further comprising planning the collision free path with a controller having a collision free motion planning algorithm; wherein the planning of the collision free path occurs in real time without offline computer analysis.

Another aspect of the present disclosure includes a method comprising: determining a predefined collision free robot path; scanning an industrial scene along the predefined collision free robot path with a scanning sensor positioned on a robot; storing scanned images of the industrial scene in a memory; constructing a 3D model of the industrial scene based on the images stored in memory; detecting an object within the 3D model of the industrial scene; moving the robot along the collision free robot path to generate a next scanning viewpoint of the detected object; scanning the industrial scene to obtain new scanned images of the object; storing the new scanned images in the memory; and repeating the moving and scanning steps until the object is identified to a threshold certainty level.

In refining aspects of the present disclosure wherein the scanning includes capturing images with a 3D camera; further comprising performing a robot task on the object after the object has been identified to the threshold certainty level; wherein the robot task includes grasping the object; further comprising panning, tilting and rotating the scanning sensor to capture images from different vantage points to generate a new 3D model of the industrial scene; further comprising planning a next scanning path prior to generating the new 3D model of the industrial scene; wherein the planning includes analyzing the new 3D model with a controller having a collision free motion planner algorithm; and further comprising determining the next scanning path based on results from a collision free motion planning algorithm.

Another aspect of the present disclosure includes a method comprising: determining a predefined collision free robot path; scanning an industrial scene proximate a robot with a scanning sensor; storing scanned images of the industrial scene in a memory; constructing a 3D model of the industrial scene based on the images stored in memory; detecting an object within the industrial scene; determining whether the object is recognized with sufficient precision; determining whether a robot task can be performed on the object; and performing one or more robot tasks on the object after the object is recognized with sufficient certainty.

In refining aspects of the present disclosure the method further comprises generating a next scanning viewpoint and rescanning the industrial scene if the object is not recognized with sufficient certainty; further comprising generating a next scanning viewpoint and rescanning the industrial scene if the 3D model of the industrial scene is not sufficient for grasping analysis; further comprising generating a next scanning viewpoint and rescanning the industrial scene if the 3D model of the industrial scene is not complete; wherein the scanning of the industrial scene includes panning, tilting, rotating and translating the scanning sensor relative to the robot; further comprising planning the collision free path by a controller having a collision free motion planning algorithm; and wherein the planning occurs in real time without offline computer analysis.

While the application has been illustrated and described in detail in the drawings and foregoing description, the same is to be considered as illustrative and not restrictive in character, it being understood that only the preferred embodiments have been shown and described and that all changes and modifications that come within the spirit of the applications are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method comprising:
    determining a predefined collision free robot path;
    moving a robot along the predefined collision free robot path;
    scanning an industrial scene with a scanning sensor mounted on the robot while moving along the predefined collision free robot path;
    storing scanned images of the industrial scene in a memory;
    constructing a 3D model of the industrial scene based on the images stored in the memory;
    performing a 3D object detection and recognition analysis of the 3D model;
    based on the 3D object detection and recognition analysis failing to meet a detection and analysis threshold, updating the 3D model by moving the robot along one or more first new collision free robot paths and scanning the industrial scene with the scanning sensor based on moving the robot along the one or more first new collision free robot paths, wherein the detection and analysis threshold indicates whether the 3D model is sufficient to detect and recognize an object;
    based on the 3D object detection and recognition analysis meeting the detection and analysis threshold, performing an object grasping and position analysis of the 3D model;
    based on the object grasping and position analysis failing to meet a grasping and position analysis threshold, updating the 3D model by moving the robot along one or more second new collision free robot paths and scanning the industrial scene with the scanning sensor based on moving the robot along the one second new collision free robot paths, wherein the grasping and position analysis threshold indicates whether the 3D model is sufficient to direct the robot to grasp the object; and
    based on the object grasping and position analysis meeting the grasping and position analysis threshold, directing the robot to grasp and pick up the object.

2. The method of claim 1, wherein the scanning sensor is a 3D camera.

3. The method of claim 1 further comprising moving the scanning sensor relative to the robot when determining the predefined collision free path.

4. The method of claim 3, wherein the moving of the scanning sensor includes panning, tilting, rotating and translating movement relative to the robot.

5. The method of claim 3, wherein the moving of the scanning sensor includes moving an arm of the robot while a base of the robot remains stationary.

6. The method of claim 1 further comprising planning the collision free path with a controller having a collision free motion planning algorithm.

7. The method of claim 1, wherein the planning of the collision free path occurs in real time without offline computer analysis.

8. A control system comprising:
    a controller configured to:
        determine a predefined collision free robot path;
        move a robot along the predefined collision free robot path;

scan an industrial scene with a scanning sensor mounted on the robot while moving along the predefined collision free robot path to obtain first scanned images;

store scanned images of the industrial scene in a memory;

construct a 3D model of the industrial scene based on the scanned images;

perform a 3D object detection and recognition analysis of the 3D model;

based on the 3D object detection and recognition analysis of the 3D model failing to meet a detection and analysis threshold, update the 3D model by moving the robot along one or more first new collision free robot paths and scanning the industrial scene with the scanning sensor based on moving the robot along the one or more first new collision free robot paths, wherein the detection and analysis threshold indicates whether the 3D model is sufficient to detect and recognize an object;

based on the 3D object detection and recognition analysis of the 3D model meeting the detection and analysis threshold, perform an object grasping and position analysis of the 3D model;

based on the object grasping and position analysis failing to meet a grasping and position analysis threshold, update the 3D model by moving the robot along one or more second new collision free robot paths and scanning the industrial scene with the scanning sensor based on moving the robot along the one second new collision free robot paths, wherein the grasping and position analysis threshold indicates whether the 3D model is sufficient to direct the robot to grasp the object; and based on the object grasping and position analysis meeting the grasping and position analysis threshold, direct the robot to grasp and pick up the object.

* * * * *